United States Patent [19]

Bassett et al.

[11] Patent Number: 5,477,792
[45] Date of Patent: Dec. 26, 1995

[54] APPARATUS FOR PREPARING SOIL FOR SEED AND METHOD OF USING THE APPARATUS

[75] Inventors: James H. Bassett, Sycamore; Timothy R. Baer, Tremont, both of Ill.

[73] Assignee: Dawn Equipment Company, Sycamore, Ill.

[21] Appl. No.: 140,683

[22] Filed: Oct. 21, 1993

Related U.S. Application Data

[63] Continuation-in-part of Ser. No. 97,979, Jul. 27, 1993, abandoned.

[51] Int. Cl.⁶ .............................. A01B 5/00; A01B 49/04; A01C 5/00
[52] U.S. Cl. .......................... 111/121; 111/139; 111/164; 111/191; 111/200; 111/900; 172/148; 172/149; 172/155; 172/177; 172/520; 172/540
[58] Field of Search .................................. 111/200, 118, 111/121, 81, 164, 191, 192, 139, 900; 172/148, 149, 155, 177, 520, 540

[56] References Cited

U.S. PATENT DOCUMENTS

| | | | |
|---|---|---|---|
| 1,247,744 | 11/1917 | Trimble | 111/81 |
| 2,691,353 | 4/1951 | Secondo | 111/164 X |
| 2,754,622 | 7/1956 | Rohnert | 111/118 X |
| 2,799,234 | 10/1957 | Chancey | 111/121 X |
| 4,141,676 | 2/1979 | Jannen et al. | 111/118 X |
| 4,438,710 | 3/1984 | Paladino | 111/3 |
| 4,596,200 | 6/1986 | Gafford et al. | 111/164 X |
| 4,785,890 | 11/1988 | Martin | 172/520 X |
| 4,998,488 | 3/1991 | Hansson | 111/121 X |
| 5,033,397 | 7/1991 | Colburn, Jr. | 111/118 |
| 5,074,227 | 12/1991 | Schwitters | 111/164 X |
| 5,129,282 | 7/1992 | Bassett et al. | 74/529 |
| 5,269,237 | 12/1993 | Baker et al. | 111/121 |

Primary Examiner—Dave W. Arola
Assistant Examiner—Christopher J. Novosad
Attorney, Agent, or Firm—Arnold, White & Durkee

[57] ABSTRACT

A method of continuously applying an additive to soil with a soil treating apparatus as the soil treating apparatus is advanced in a travel direction along a planting path on soil being treated. The method includes the steps of resituating residue in the planting path in a lateral direction transverse to the travel direction away from the planting path, applying an additive to the soil, and moving soil laterally inwardly over the planting path after the additive is applied to the soil. An apparatus is provided for practicing the method.

12 Claims, 5 Drawing Sheets

5,477,792

APPARATUS FOR PREPARING SOIL FOR SEED AND METHOD OF USING THE APPARATUS

CROSS-REFERENCE

This application is a continuation-in-part of application Ser. No. 08/097,979 filed Jul. 27, 1993, entitled "Apparatus for Continuously Treating Soil", now abandoned.

BACKGROUND OF THE INVENTION

1. Field of the Invention

This invention relates to agricultural equipment and, more particularly, to an apparatus for clearing residue from planting strips and applying an additive thereto in preparation for seeding. The invention further relates to a method of using the apparatus.

2. Background Art

There are many planting techniques currently practiced by farmers. Under most conventional processes, planting of a field is carried out in steps. First, the entire field is worked to break up the soil, break loose residue from the preceding year's crops, and break down and work the residue into the tilled soil. The planting rows in the prior year are eliminated so that the entire field has a substantially homogenous soil texture.

This conventional technique has numerous drawbacks. First of all, this technique requires the performance of multiple steps to effect planting of the field. The field is first cultivated during one or more passes of a cultivator over the field. A separate planter attachment is then utilized to deposit seed and spray fertilizer, or other additive, in an entirely separate operation. To carry out the different operations, the user is required to connect and disconnect equipment to and from a towing vehicle.

A further problem with this conventional technique is that the residue, such as corn stalks, may not be effectively pulverized, even though several passes are made over the field with the cultivator unit. The result is that the residue may jam up in the planter unit and/or block the placement of the seed and application of fertilizer.

A further problem with this conventional technique is that cultivation of the entire field increases soil erosion from both rain and wind. Not only is this undesirable from the standpoint of loosing fertile soil, but of late the federal government has imposed restrictions on erosion by requiring that a certain amount of ground cover remain in place at all times in fields.

These problems led to the development of planting techniques whereby unpulverized residue/ground cover is left in the field. The soil treatment is confined to strips in which planting takes place. Residue remains in the rows adjacent to the strips. While this type of strip treatment of soil overcomes a number of problems, such as that of erosion, it introduces complicating factors.

This planting technique complicates the application of an additive to the soil. It is common to pre-treat the field with an additive, such as anhydrous ammonia, in the fall preceding a planting season, to allow the soil to absorb the additive. Typically, the anhydrous ammonia is introduced by a delivery conduit on a fertilizer knife which penetrates several inches into the soil to release the additive beneath the soil surface. The fertilizer knife is constructed to effectively part residue in its path. However, the residue tends to wrap around the knife and progressively build up thereon. This problem is referred to in the industry as "hairpinning".

To overcome the hairpinning problem, one manufacturer uses a coulter wheel upstream of the fertilizer knife. The coulter wheel breaks up residue in the path of the fertilizer knife so that it will pass laterally to the sides of the knife.

However, even with the coulter/fertilizer knife combination, a problem still persists. The fertilizer knife creates a relatively deep slot which must be closed to retain the additive. Since anhydrous ammonia tends to vaporize rapidly, it is very important to promptly seal the slot defined by the fertilizer knife.

Heretofore, this sealing has been attempted by using a trailing pair of concave disks, which cooperate to cut the soil and develop a mound over the slot defined by the fertilizer knife. Several problems are associated with this type of closing mechanism.

First of all, the closing disks pick up residue and clumps of soil which are placed over the slot. The residue and clumps bridge the slot opening and block passage of loose soil to the bottom of the slot and thereby prevent the effective sealing thereof. As a result, the additive may evaporate off before it is absorbed in any significant amount by the soil.

Another problem with the above system is that the closing disks themselves cut a trench in the soil which trench is not effectively closed and sealed by the soil having clumps and residue therein. Even if loosened soil is deposited by the disks against the compacted trench walls, the loosened and compacted soil does not blend. The result is that, as the soil dries, cracks develop through which the additive can freely evaporate.

Due to the problems of confining additive such as anhydrous ammonia, many farmers choose to simultaneously apply the additive at the time of planting in the spring. When this is done, the concentration of the additive must be reduced. That is, an amount of additive that would be optimum for growing, if fully absorbed by the soil would burn the seed if simultaneous additive application and planting took place. Consequently, the amount of additive is significantly reduced, as a result of which a less than desirable amount of additive is absorbed by the soil. The end result is that the crop quality may be compromised.

A still further problem arises from the fact that a significantly larger volume of fertilizer is used per acre than seed. If the additive is applied and the seed planted simultaneously, the farmer is required to regularly halt operations and refill the additive supply bin. Ideally, the farmer travels continuously, without interruption, over an entire field during a planting operation.

SUMMARY OF THE INVENTION

The present invention is specifically directed to overcoming the above-enumerated problems in a novel and simple manner.

The invention contemplates a method of continuously applying an additive to soil with a soil treating apparatus as the soil treating apparatus is advanced in a travel direction along a planting path on soil being treated. The method includes the steps of resituating residue in the planting path in a lateral direction transverse to the travel direction away from the planting path, applying an additive to the soil, and moving soil laterally inwardly over the planting path after the additive is applied to the soil.

By moving the residue away from the planting path, the additive can be applied to the soil without interference from the residue. The soil replaced on the planting path can be used to effectively seal in the additive.

In one form of the invention, the seed is planted after the additive is applied and absorbed into the soil. Planting is done in a separate operation, preferably at least two hours after the additive is applied and covered with soil. Preferably a longer period is allowed between the time the additive is applied and planting takes place.

The soil can be parted before applying additive to enhance residue and soil breakup. This soil parting can be accomplished by a rotating coulter wheel that parts the soil in the planting path.

In one form, the residue is resituated by rotating a toothed wheel about an axis transverse to the travel direction so that the toothed wheel picks up and moves residue in the planting path away from the planting path. The axis may reside in a plane that is non-perpendicular to the travel direction. The toothed wheel, in addition to removing the residue, breaks up the soil, preferably upstream of the additive application, to provide a loosened bed of soil to receive the additive.

For most effective operation, the toothed wheel can be controllably biased downwardly against the soil.

In one preferred form, the residue is resituated by first and second toothed wheels which rotate about first and second axes that are transverse to each other and the travel direction. Each of the first and second axes may reside in a plane that is non-perpendicular to the direction of travel. The teeth on the first and second wheels can mesh to enhance breakup of residue.

In one form, the additive applying step involves applying an additive beneath the surface of the soil, as by a fertilizer knife. With the first and second wheels in a leading direction, the soil can be broken up so that a deep trough is not defined in the soil by the fertilizer knife, which trough is difficult to close.

The lateral movement of the soil over the planting path, after the additive is applied, can be accomplished by one and preferably a pair of toothed wheels. These wheels can be arranged to rotate about axes that are transverse to each other and the travel direction. The spacing of these wheels is preferably variable so that the spacing can be set to be greater than that between the wheels which clear the residue. Consequently, the user has the flexibility of controlling the mount of residue that is deposited with the soil over the additive. A greater spacing picks up more residue from the rows adjacent to the planting path.

The invention is further directed to a method of continuously applying an additive to soil, including the steps of applying an additive to the soil and moving soil laterally inwardly over the planting path after the additive is applied to the soil.

The invention further contemplates an apparatus for applying an additive to soil, which apparatus has a frame to be advanced in a travel direction over a planting path, first structure on the frame for resituating residue in a lateral direction transversely to the travel direction away from the planting path, second structure on the frame for applying an additive to soil in the planting path, and third structure for moving soil laterally over the planting path after additive is applied to the soil by the second structure as the apparatus is advanced in the travel direction.

In one form, the first structure includes at least one wheel mounted to the frame for rotation about an axis that is transverse to the travel direction. The wheel may have teeth thereon. First and second toothed wheels can be used, which wheels are either fully separated from each other or arranged so that the teeth thereon are in mesh.

In one form, the second structure penetrates the soil and delivers an additive from a supply to the soil beneath the surface thereof.

A structure, such as a coulter wheel, can be provided upstream of the second structure to part the soil.

The third structure can be a toothed wheel that is rotatable about an axis that is transverse to the travel direction. Third and fourth such toothed wheels can be provided, with both the third and fourth wheels being rotatable about axes that are transverse to the travel direction.

Structure can be provided for continuously biasing one or both of the wheels on the first and third structures into the soil. In one form, the height of all of the wheels is variable to control the application pressure for the wheels.

The third and fourth wheels can be mounted to the frame so that the spacing therebetween is variable. In one form, the spacing of the third and fourth wheels is greater than that of the first and second wheels. With this arrangement, residue and soil, in addition to that resituated by the first and second wheels, can be directed over the soil with the additive therein, to provide better confinement of the additive and more ground cover to prevent erosion of the soil.

Further according to the invention, an apparatus is provided for applying an additive to soil, which apparatus has a frame to be advanced in a travel direction over a planting path, structure on the frame for applying an additive to soil in the planting path, and structure for moving soil laterally over a planting path after an additive is applied to the soil by the soil applying means as the apparatus is advanced in the travel direction.

DETAILED DESCRIPTION OF THE DRAWINGS

Figure 1:
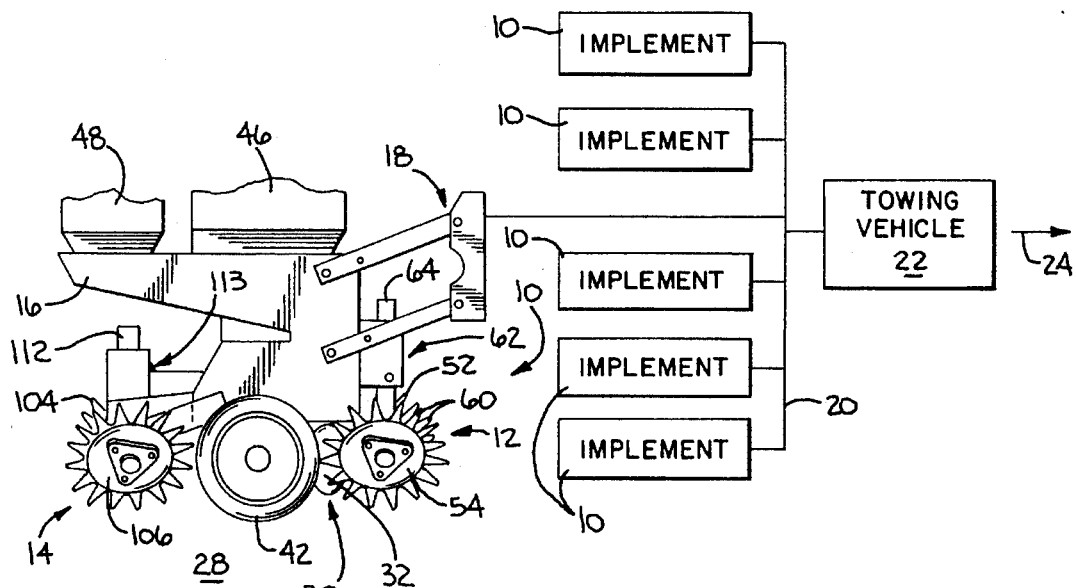
FIG. 1 is a side elevation view of an implement having structure thereon, according to the present invention, for treating soil, according to the present invention.
Figure 4:
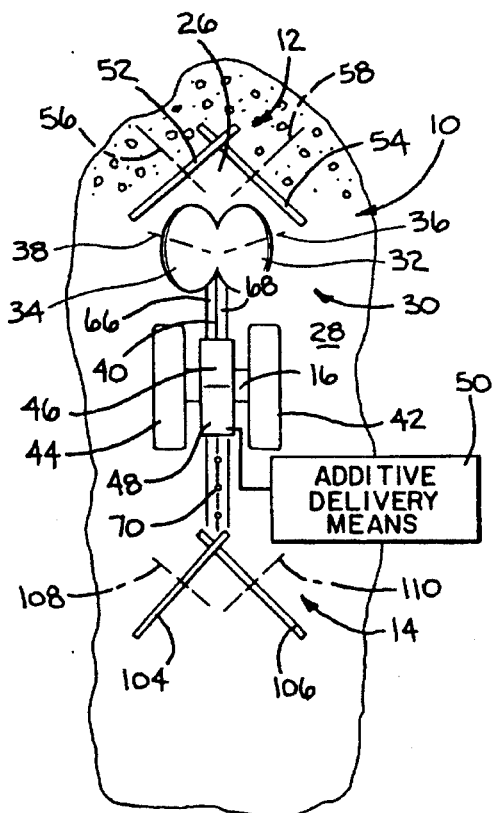
FIG. 4 is a schematic plan view of the functional elements on the implement of FIG. 1.

In FIGS. 1 and 4, an implement is shown at 10, with means at 12, 14 for treating soil according to the present invention. The implement 10 has a frame 16 to which the means 12, 14 are attached. The frame 16 includes a mounting linkage 18 which is connected to a towing frame 20 that is drawn by a towing vehicle 22, typically a tractor. A plurality of the implements 10 are connected to the towing frame 20 to be simultaneously advanced by the towing vehicle 22 in a forward travel direction, as indicated by the arrow 24.

The implement 10 performs numerous functions. The means 12 repositions residue laterally away from the intended planting line 26 and loosens the top layer of soil 28 in the vicinity of the planting line 26.

Downstream of the means 12 is a V-opener 30 consisting of laterally spaced, cooperating disks 32, 34 which rotate about transverse axis 36, 38 that are non-parallel to each other and the line of forward travel of the vehicle 22. The disks 32, 34 are toed in at the bottoms thereof so that they cooperatively make a desired angle for an upwardly opening, V-shaped slot 40 in the soil 28.

Gauge wheels 42, 44 support the frame 16 for movement through the soil 28 and maintain the frame 16 at a predetermined height relative to the soil 28. The means 12 perform a leveling function on the soil 28 in the path of the gauge wheels 42, 44 so that the frame 16 is maintained at a substantially uniform height by the gauge wheels 42, 44.

Supplies of seed and an additive can be simultaneously maintained on the frame 16 in separate bins 46, 48 mounted above the gauge wheels 42 so that the seed in the bin 46 can flow by gravity to be directed between the gauge wheels 42, 44 and into the open soil slot 40. Additive from the bin 48 can be delivered by an appropriate means 50, which may be in the form of a nozzle, to the soil 28, preferably downstream of the location at which the seed is introduced.

The means 14 is located downstream of the point of introduction of the seed, for reasons that will be described below, in conjunction with the description of the two means 12, 14.

The means 12 consist of cooperating, toothed wheels 52, 54 mounted to the frame 16 for rotation about axes 56, 58, which axes 56, 58 are transverse to each other and non-parallel to the line of travel of the towing vehicle 22 and the drawn implements 10.

The wheels 52, 54 are preferably toed in slightly at their bottom edges and relatively positioned so that teeth 60 on the wheels 52, 54 are in mesh. The orientation of the wheels 52, 54 causes them to be rotated as they are dragged through the soil 28. The meshed relationship of the wheels 52, 54 produces a scissors action that breaks up residue and masses of soil and causes the residue to be worked into the soil. The large masses of soil that are broken up are evenly distributed on the field.

Preferably, a means is provided at 62 for mounting the wheels 52, 54 relative to the frame for vertical movement relative thereto. The mounting means 62 includes a vertically extending stem 64 at the bottom of which the wheels 52, 54 are mounted. One suitable mechanism for mounting the stem 64 for controlled vertical movement is described fully in my U.S. Patent No. 5,129,282, which is incorporated herein by reference.

The normal operating height for the wheels 52, 54 is such that the wheels 52, 54 do not penetrate the soil 28 to the full depth of the seed slot 40 that is formed by the V-opener 30. As a result, the V-opener 30 may encounter relatively hard soil 28 at the base of the slot 40. The untreated soil 28 at the base of the slot 40 may be moist so that the disks 32, 34 on the V-opener 30 form the slot 40 primarily by compaction of the soil 28 against the walls 66, 68 of the slot 40. Consequently, when the slot 40 is being closed, there is less soil 28 available than is necessary to fill the slot 40 sufficiently to completely cover the seed 70 placed therein from the supply 46.

Figure 7:
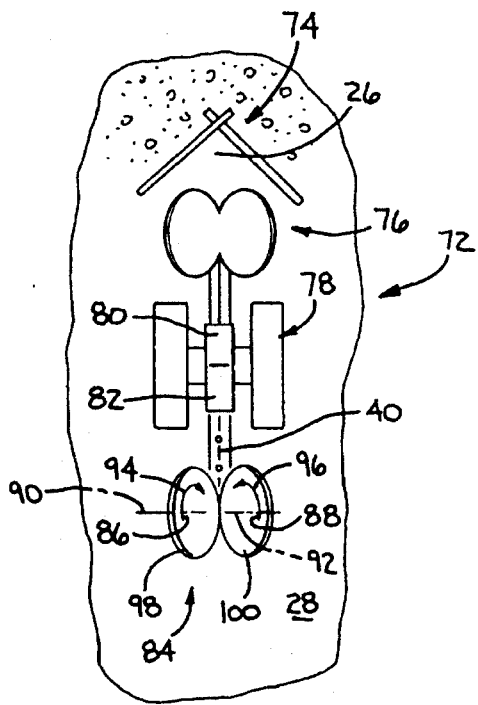
FIG. 7 is a plan view of the functional elements of a prior art implement.

This latter problem can be explained more fully with respect to the prior art implement, shown schematically at 72 in FIG. 7. The implement 72 has a cooperating pair of toothed wheels 74, a V-opener 76, a pair of gauge wheels 78, and separate supplies of seed and additive 80, 82, respectively, arranged in generally the same fashion as the corresponding elements on the implement 10.

Downstream of the gauge wheels 78 is a slot closing means 84 consisting of cooperating wheels 86, 88, rotatable about axes 90, 92, respectively. The wheels 86, 88 converge from top to bottom and are toed slightly inwardly at their rear portions. Resultingly, as the wheels 86, 88 are dragged through the soil 28, they rotate automatically in the direction of the arrows 94, 96 relative to each other. The outer edges 98, 100 of the wheels 86, 88 direct soil 28 that is displaced laterally to the side of the planting line 26 by the V-opener 76 back into the seed slot 40 and effect a slight compaction of the soil 28.

Figure 8:
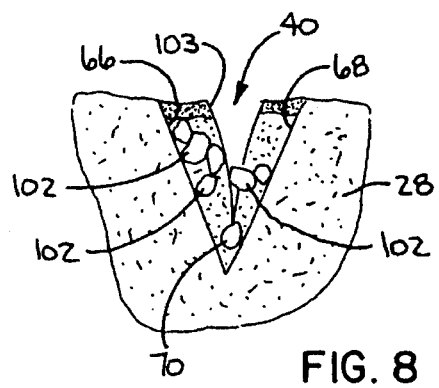
FIG. 8 is a cross-sectional view of the seed slot with seed therein and soil distributed in the slot using a conventional implement of the type in FIG. 7.
Figure 9:
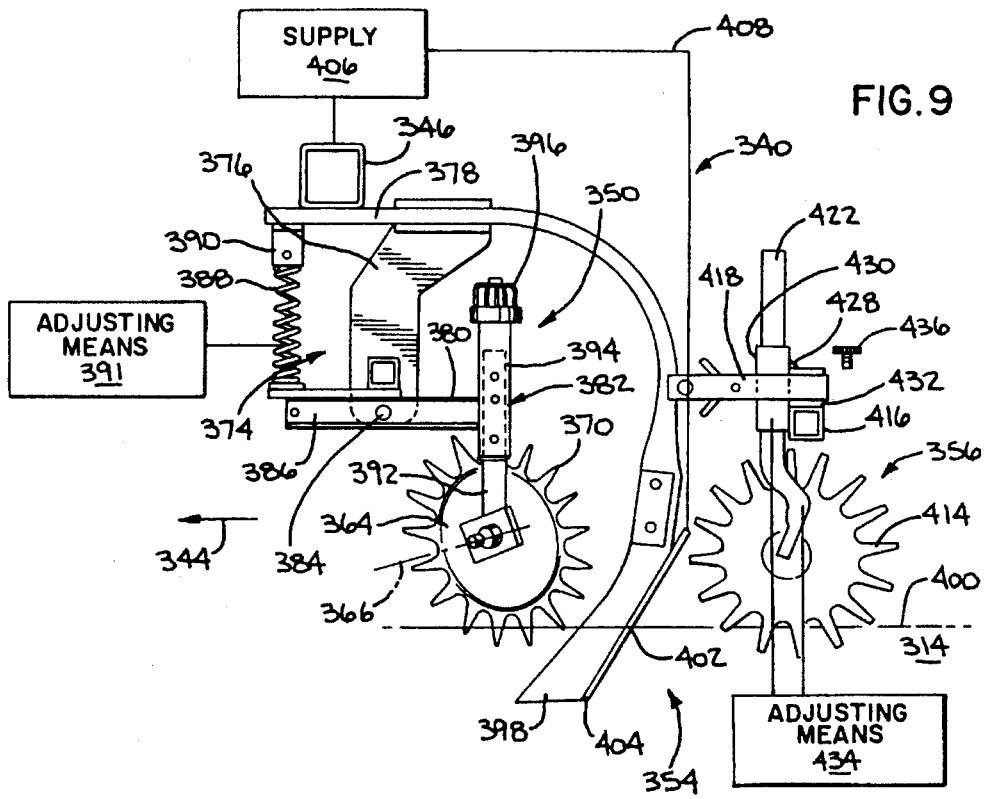
FIG. 9 is a side elevation view of a modified form of apparatus, according to the invention, for applying an additive to strips of soil in a field.

The closed slot 40 using the implement 72 is shown in cross section in FIG. 8. The wails 66, 68 of the slot 40, as formed by the V-opener 76 remain substantiaily intact. Any loose soil redistributed, i.e. pushed laterally, by the V-opener 76 is pushed back into the slot 40 by the wheels 86, 88. The wheels 86, 88 also tend to break off clumps 102 of hardened soil 28 at the edge of the slot 40, causing the clumps 102 to drop into the slot 40 and at times bridge the slot wails 66, 68 so that loosened soil 28 cannot fail down closely around the seed 70 to envelop the seed, as is desirable.

At the same time, since the soil redistributed by the V-opener 76 and available to be replaced into the slot 40 is less than necessary to fill the slot, a vertical opening 103 may remain in the soil which directly exposes the seed 70 at the bottom of the slot 40. The seed 70 may then be directly exposed to sunlight or an additive that might destroy the seed 70.

Further, if the seed is not firmly implanted in loosened soil 28, incoming water or other liquid may change the position of the seed 70 within the slot 40 and may remove the seed 70 altogether from the slot 40.

A further problem resulting from the incomplete filling of the seed slot 40 is that the small amount of loosened soil 28 that is replaced is prone to drying out more quickly than the surrounding soil 28. As a result, cracks may develop which were not present during the original pass of the implement 10. The same exposure problems, as previously discussed, are then contended with.

According to the invention, the means 14 consists of a cooperating pair of wheels 104, 106 mounted to the frame 16 for rotation about transverse axes 108, 110, both of which axes 108, 110 are non-parallel to the direction of travel of the vehicle 22. The wheels 104, 106 can have a variety of different constructions. In a preferred form, the wheels 104, 106 are toothed wheels with the same or a similar construction as the previously described wheels 52, 54. Wheels of suitable construction are currently being offered by the assignee on a commercial basis under the trademark TRASHWHEELS®.

The wheels 104, 106 are situated in the same orientation as the wheels 52, 54 and are preferably in mesh, though they need not be. The wheels 104, 106 are automatically rotated as they contact the soil 28 as the implement 10 is advanced.

Figure 6:
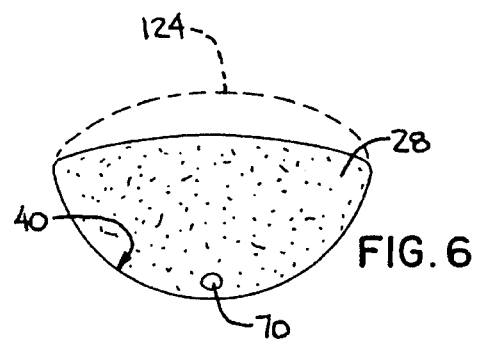
FIG. 6 is a cross-sectional view of a seed slot with seed located therein and soil distributed over the seed using structure according to the present invention.

The wheels 104, 106 break down the soil 28 in the vicinity of the planting line 26 and cause a reconfiguration of the seed slot 40, as seen in FIG. 6. The wheels 104, 16 break up the soil 28 and cause it to be placed to a substantial depth over the seed 70 in the slot 40. Consequently, even if the soil 28 dries up, an uninterrupted layer of soil 28 remains over the seed 70.

The wheels 104, 106 function effectively also to work in additive supplied by the means 50. Depending upon the depth of the wheels 104, 106, the soil 28 can be loosened to a substantial depth and the additive mixed thereinto for a homogeneous deposition of the additive.

In another form, the means 50 for delivering the additive may deliver the additive below the running depth for the wheels 104, 106. The wheels 104, 106 then distribute a homogeneous blanket of soil over the additive so that the soil 28 acts as a barrier layer to prevent the free escape of the additive, as by evaporation.

The wheels 104, 106 are mounted on a vertically extending stem 112 with there being means at 113, similar to the means 62, for mounting the stem 112 for vertical movement relative to the implement frame 16.

Figure 2:
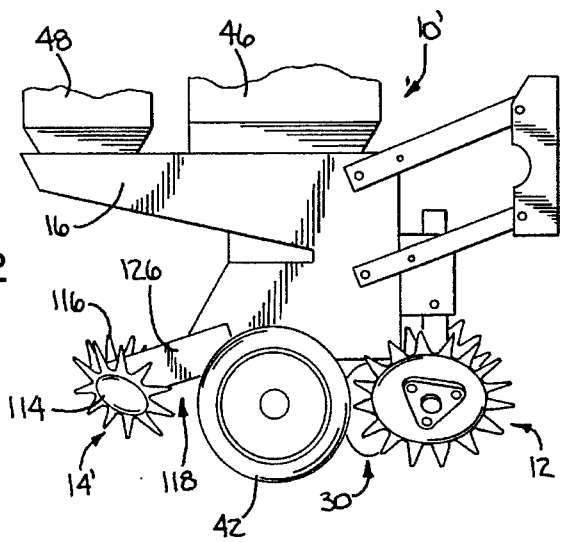
FIG. 2 is a side elevation view of a modified form of implement according to the present invention.
Figure 5:
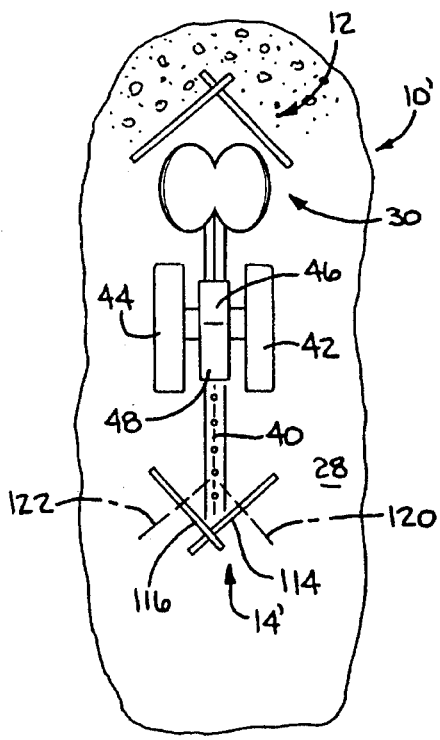
FIG. 5 is a view as in FIG. 4 for the implement in FIG. 2.

One variation of the inventive structure is shown in FIGS. 2 and 5. In FIGS. 2 and 5, an implement 10' is shown having a first means 12, a V-opener 30, gauge wheels 42, 44 and seed and additive supplies 46, 48 mounted upon a frame 16 in the same manner as the similarly numbered elements on the implement 10 in FIGS. 1 and 4.

The principal difference with the implement 10' resides in the means 14', downstream of the gauge wheels 42, 44, which resituates the soil 28 to close the slot 40. The means 14' consists of first and second wheels 114, 116 mounted to the frame 16 by a means 118 for rotation about transverse axes 120, 122. The axes 120, 122 are arranged to that the wheels 114, 116 cooperatively define a V-shape opening in a leading direction i.e. converging in a trailing direction, with the bottoms of the wheels 114, 116 being toed slightly inwardly. With this arrangement, the wheels 114, 116 take soil from one side of the slot 40 and direct it laterally into the slot 40 with some of the soil being spilled over the slot to the other side of the slot 40. With this arrangement, a crown of soil is formed, as indicated by the dotted lines 124 (FIG. 6) over the slot 40.

The means 118 preferably mount the wheels 114, 116 so that they are vertically adjustable relative to the frame 16. This can be accomplished by making an arm 126, which carries the wheels 114, 116, pivotable relative to the frame 16. Alternatively, mounting means such as those 62, 113 on the implements 10 can be used.

Figure 3:
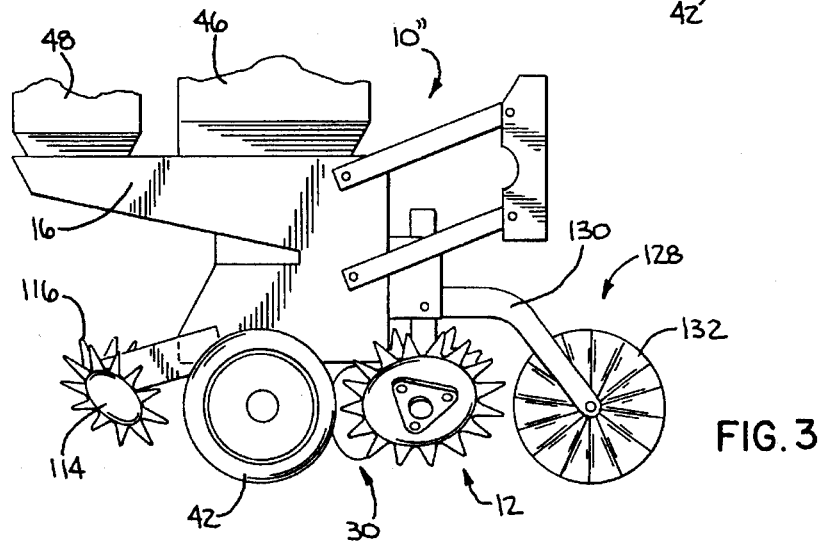
FIG. 3 is a side elevation view of a still further modified form of implement according to the present invention.

In FIG. 3, a further modified form of implement is shown at 10". The implement 10" has a means 12, a V-opener 30, gauge wheels 42, 44 (one shown) and wheels 114, 116 mounted to the frame 16 in the same manner as on the implements 10, 10'. The only modification to the implement 10" is the provision of a coulter wheel assembly at 128. The coulter wheel assembly 128 includes a depending arm 130 on the frame 16, which carries a conventional-type coulter wheel 132. The coulter wheel could be, for example, a 13-wave, 8-wave, or ripple construction, so as to part the soil 28 along approximately a 1½ inch width. The coulter wheel 132 further breaks up the soil to make it more receptive to the seed and additive. This arrangement is the subject of a separate patent application filed in the name of the assignee herein.

Description of the Preferred Embodiment

Another aspect of the invention relates to the application of an additive to soil. It is a known technique to apply an additive, such as anhydrous ammonia, to soil in the fall after harvesting an existing crop. The pre-application is desirable in that pre-applied anhydrous ammonia will be fully absorbed by the soil. However, some difficulties which arise with this technique are due principally to the volatility of the additive.

Anhydrous ammonia, which is poisonous, rapidly vaporizes. Thus, it is important that the anhydrous ammonia be deposited in such a manner that the majority of the applied amount will be absorbed by, and confined in, the soil.

The inability to effectively confine the anhydrous ammonia has prompted many farmers to apply the anhydrous ammonia in the spring simultaneously with planting. The additive is applied and the seed planted in one pass over a field. However, there are also problems inherent in this procedure.

First of all, the anhydrous ammonia does not have an opportunity to be absorbed into the soil before the seed is planted. Secondly, and more importantly, reduced amounts of the additive must be applied to avoid burning of the seed. The desired mount of anhydrous ammonia may have to be reduced by in excess of 50% to avoid seed damage. Consequently, this procedure is not preferred. This has inspired farmers to seek more effective ways to confine pre-applied additive.

Figure 17:
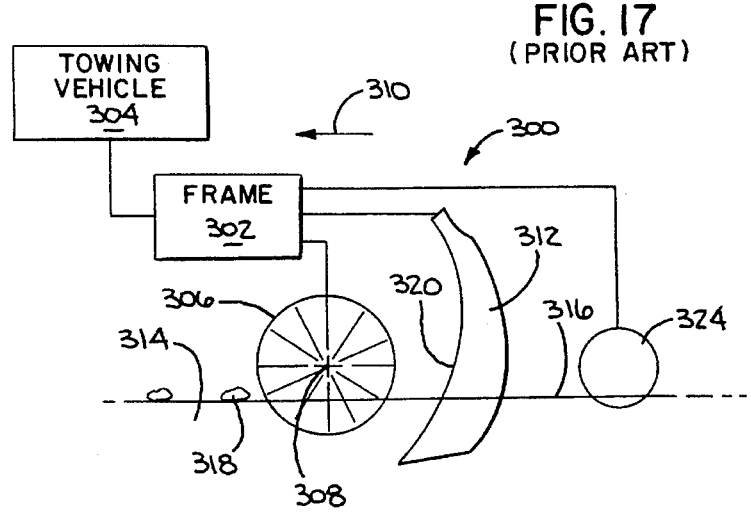
FIG. 17 is a schematic side elevation view of a prior an additive applying apparatus.
Figure 18:
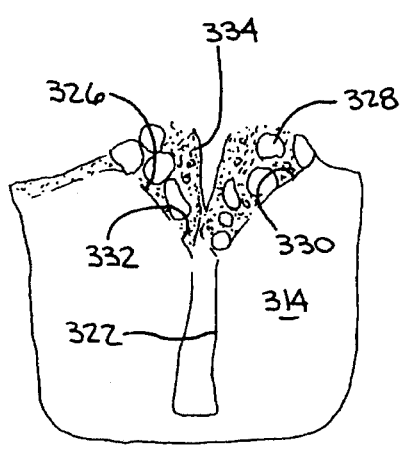
FIG. 18 is a cross-sectional view of a strip of soil treated with the additive applying apparatus in FIG. 17.
Figure 19:
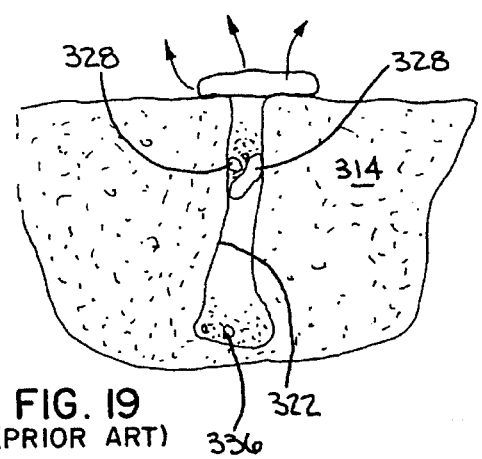
FIG. 19 is a cross-sectional view of a strip of soil showing seed planted in the soil treated with a prior art additive applying apparatus.

One existing technique, and an apparatus for carrying it out, are shown in FIGS. 17–19. In FIG. 17, a prior art additive applying apparatus is shown schematically at 300. The additive applying apparatus 300 is attached to a frame 302, such as a fertilizer bar, which is drawn by a towing vehicle 304. A plurality of the apparatus 300 are mounted to the frame 302 in laterally spaced relationship to be simultaneously drawn through a field in a travel direction.

At the upstream portion of the apparatus 300, a coulter wheel 306 is mounted for rotation about a laterally extending axis 308, that is at right angles to the direction of travel of the towing vehicle 304 and apparatus 300, as indicated by the arrow 310.

Downstream of the coulter wheel 306 is an additive applying knife 312, which penetrates the underlying soil 314 and deposits additive from a supply (not shown) on the frame 302 at a point beneath the surface 316 of the soil 314.

The function of the coulter 306 is principally to sever residue 318 on the surface 316 of the soil 314 that is in the path of the knife 312 to prevent "hairpinning" by the residue 318 around the leading edge 320 of the knife 312.

In relatively hard and wet soil, the knife 312 carves a well defined slot 322 in the soil 314, which slot 322 must be closed to prevent the escape of applied additive. A pair of concave disks 324 are located downstream of the knife 312 and cooperate to place soil over the slot 322. The dish 324 cut the soil 314 and produce a shallow trench 326 in so doing. The disks 324 mound loose soil, together with soil clumps 328 and residue, over the trench 326, as shown in FIG. 18. The clumps 328 may not fall into the slot 322 and bridge gaps in the slot 322 and trough 326 to prevent complete sealing of the slot 322. With the gaps present, the additive is allowed to rise through the soil 314 which, in addition to being wasteful, is environmentally unsound.

Even if the soil 314 is relatively fine, this technique does not effectively cause sealing of the slot 322. The disks 324 tend to compact the soil against the walls 330, 332 of the trench 326 so that the replaced soil 314 does not effectively blend with the compacted soil on the walls 330, 332. The result is that the loosened and compacted soil dries out at different rates. As the soil 314 dries out, cracks 334 develop which provide an escape passage for additive in the soil 314.

A further problem with this technique is that the disks 324 produce a relative sharply pitched and narrow mound over the slot 322. This mound is readily broken down and/or washed away by wind and rain, thereby exposing the additive which then readily vaporizes.

While the disks 324 introduce some of the above problems, in the absence of their use, the slot 322 remains substantially open, as shown in FIG. 19. Not only is this a problem from the standpoint of the escape of additive, but it introduces a problem with planting. The soil 314 around the slot 322 may dry out and harden, so that a well defined slot 322 remains through the winter. In the spring, when the seed 336 is planted, it may fall to the bottom of the slot 322 with the result being that effective germination may not occur. Alternatively, if only part of the slot 322 is covered, the seed 336 may be planted at different depths, with the result being that the crop quality varies significantly.

The present invention overcomes the above problems and facilitates the selective preparation of strips of soil before planting. More particularly, the invention is directed to an apparatus for applying additive, as shown at 340, in FIGS. 9–12.

The additive applying apparatus 340 is intended to be drawn behind a towing vehicle 342, which moves in a travel direction as indicated by the arrow 344.

Figure 10:
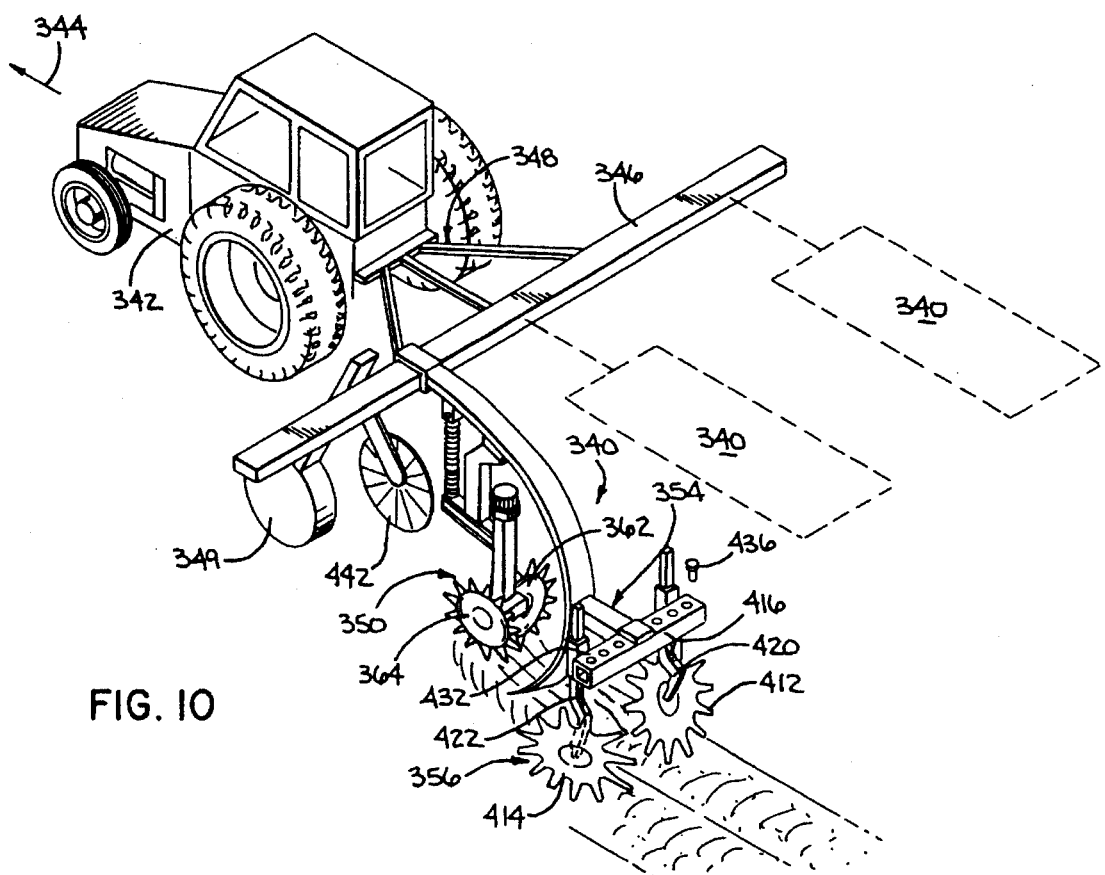
FIG. 10 is a perspective view of a towing vehicle drawing a plurality of the additive applying apparatus of FIG. 9.
Figure 11:
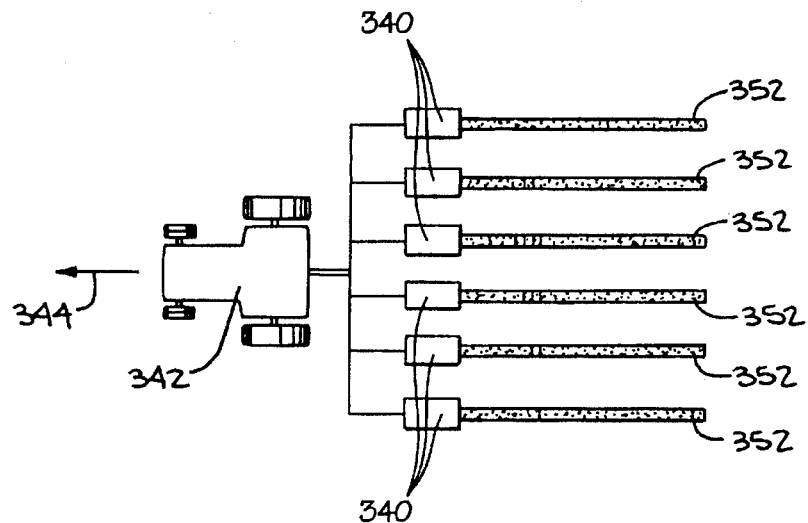
FIG. 11 is a schematic plan view of a towing vehicle drawing a plurality of the additive applying apparatus through a field.
Figure 12:
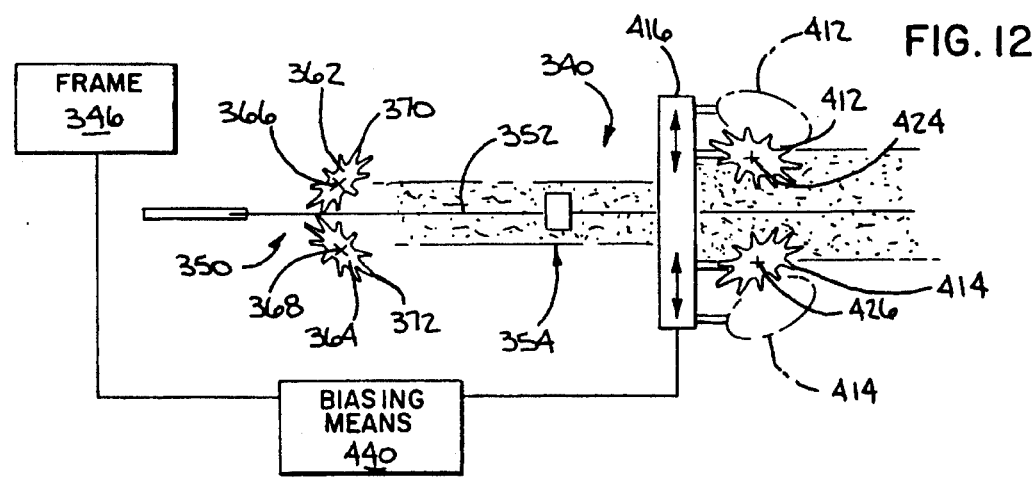
FIG. 12 is a schematic plan view of the inventive additive applying apparatus.

A laterally extending fertilizer bar 346, of a known construction, is secured to the towing vehicle 342 through a three point hitch assembly 348. Adjustable gauge wheels 349 (one shown) maintain the fertilizer bar 346 at a desired height. The fertilizer bar 346 defines a frame for attachment of a plurality of the apparatus 340 in laterally spaced arrangement, as shown in FIGS. 10 and 11.

Each additive applying apparatus 340 has means for performing three different functions. A first means 350, at the upstream end of the apparatus 340, resituates residue in a planting path 352. A second means 354 applies an additive to the soil 314. A third means 356 moves soil laterally inwardly over the planting path after the additive is applied by the second means 354. With this arrangement, additive is applied in the individual planting paths/strips 342 and covered up effectively with a blanket of soil and residue so that the additive is positively confined in the planting path/strips 352 long enough to be absorbed into the soil 314.

Figure 13:
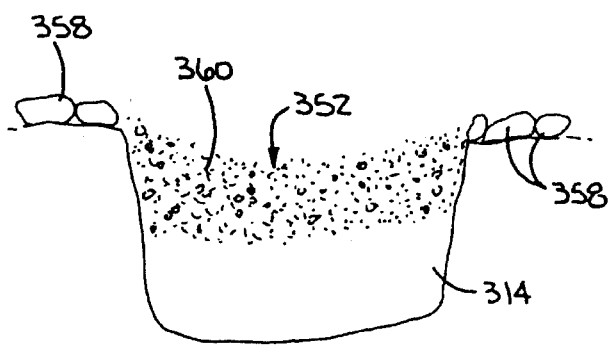
FIG. 13 is a cross-sectional view of a strip of soil showing a first stage of treatment by the additive applying apparatus wherein residue is resituated away from a planting path.

More particularly, the first means 350 is constructed to penetrate the soil 314 in the planting path to a depth on the order of 2–4 inches. The means 350 moves residue 358 laterally away from the planting path 352, as shown in FIG. 13. At the same time, the first means 350 defines a bed 360 of loosened soil that is substantially free of the residue 358.

To accomplish these functions, at least one, and preferably a pair of toothed wheels 362, 364 are utilized. The wheels 362, 364, which are preferably the type sold under the TRASHWHEELS® trademark, are arranged so that their rotational axes 366, 368 are transverse to each other and the travel direction 344. More particularly, the wheels 362, 364 are toed in at their bottoms and diverge in a downstream direction so that the axes 366, 368 each reside in a plane that is non-perpendicular to the travel direction for the additive applying apparatus 340. The teeth 370, 372 on the wheels 362, 364 are preferably in mesh to thereby break up residue with a scissors action as the apparatus 340 is advanced. The described arrangement of the wheels 362, 364 results in their being automatically rotated as they are drawn through the underlying soil 314.

The wheels 362, 364 are held on the frame 346 by a mounting assembly 374. The mounting assembly 374 includes a plate 376 depending from a cantilevered arm 378 projecting rearwardly from the frame 346. The lower end of the plate 376 carries a pivot arm 380, which in turn carries a support 382 for the wheels 362, 364.

The pivot arm 380 is connected to the plate 376 by a laterally extending pin 384, which permits the arm 380 to pivot at its midportion about a laterally extending axis. The wheel support 382 is mounted to the pivot arm 380 downstream of the pivot pin 384. The forwardly projecting portion 386 of the arm 380 is connected to one end of a tension spring 388, with the other end of the tension spring 388 attached to the arm 378 by means of a bracket 390.

With this arrangement, the spring 388 exerts a constant upward bias on the forward arm portion 386, which bears the support 382 and wheels 362, 364 carried thereby, downwardly against the soil 314. An optional adjusting means 391 can be provided to selectively change the tension exerted by the spring 388.

The force exerted by the wheels 362, 364 on the soil 3 14 can also be changed by varying the height of the wheels 362, 364 relative to the arm 380. This is accomplished by varying the relative vertical positions of a stem 392, which carries the wheels 362, 364, relative to a female receptacle 394 on the support 382 with which the stem 392 is telescopingly mated. The relative lengthwise positions of the stem 392 and receptacle 394 are maintained by a mechanism, which is described in detail in U.S. Pat. No. 5,129,282, assigned to the assignee herein. The disclosure in U.S. Pat. No. 5,129,282 is incorporated herein by reference, and thus no detailed description of that mechanism is required herein. It suffices to say that the wheels 362, 364 can be moved into a plurality of different vertical positions and releasably maintained in each of these positions. This adjustment is facilitated by the provision of a knurled operating knob 396 at the top of the support 382.

The second means 354 consists of a knife 398, which penetrates the soil 314 to a depth of 3–6 inches below the surface 400 of the soil. The knife 398 carries delivery tubes 402 from which additive is discharged into the soil 314 at a point 404 beneath the surface 400. Additive from a supply 406 is communicated to the delivery tubes 402 through an appropriate conduit 408. The details of a suitable means 354 for applying an additive to the soil 314 are shown in U.S.

Pat. No. 5,240,080, assigned to the assignee herein. Consequently, a further description of the means 354 herein is unnecessary.

Figure 14:
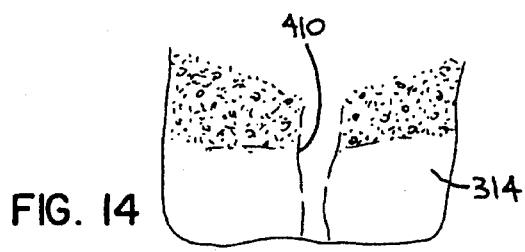
FIG. 14 is a view as in FIG. 13 during a second stage wherein an additive is applied.
Figure 16:
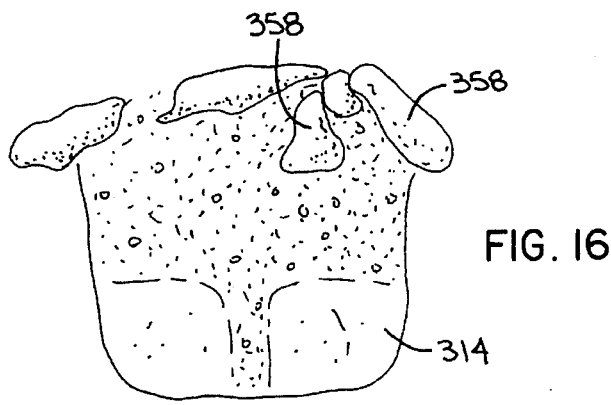
FIG. 16 is a view as in FIG. 15 wherein the apparatus is adjusted to move a greater mount of soil and existing residue over the planting path.

In FIG. 14, the effects of the knife 398 on the soil 314 can be seen. The knife 398 creates a slot 410 in and beneath the bed 360 of loosened soil 314. The means 356 is designed to close the slot 410 as well as define a blanket of soil 314 and residue 358 over the planting path 352.

More particularly, the third means 356 includes laterally spaced, toothed wheels 412, 414. The wheels 412, 414 are mounted in depending fashion from a support bar 416 attached to the arm 378 by a mounting arm 418.

The wheels 412, 414 are each carried on a mounting stem 420, 422, respectively. The wheels 412, 414 are mounted for rotation about axes 424, 426, which are transverse to each other and the travel direction 344. The wheels 412, 414 are toed inwardly at their bottoms and converge downstream so that the wheels 412, 414 are self-propelled as they are drawn through the soil 414. Each axis 424, 426 resides in a plane that is non-perpendicular to the travel direction. The TRASHWHEELS® residue cleaning device can be used for each of the wheels 412, 414. Other types of toothed wheels would also function satisfactorily.

The mounting of the stems 420, 422 to the support bar 416 will be described with respect to one exemplary stem 422. The stem 422 is connected to the support bar 416 by a bracket 428, which includes a vertically extending sleeve 430 and a transverse plate 432 fixedly connected thereto.

A suitable adjusting means 434 allows the stem 422 to be maintained in a plurality of different positions relative to the stem 430 for height adjustment of the wheel 414. The plate 432 overlies the support bar 416 and can be moved laterally therealong and maintained in a desired lateral position by a bolt 436.

With this arrangement, the lateral spacing between the wheels 412, 414 can be varied. The height of the wheels 412, 414 can be changed individually. The significance of this adjusting capability is described below.

Figure 15:
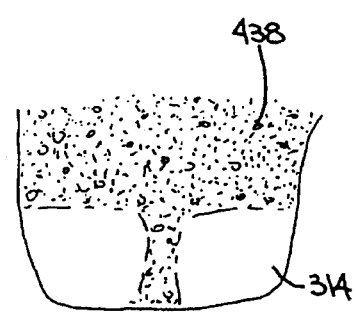
FIG. 15 is a view as in FIG. 14 during a third stage of treatment wherein soil is replaced over the planting path.

The means 356 is designed to laterally move soil 314 back onto the planting path 352, after the additive is applied, to define a blanket that confines an additive within the soil 314. The rotating wheels 412, 414 place a layer 438 of loosened soil 314 over the planting path 352. With the spacing between the wheels 4 12, 414 the same as or slightly greater than the spacing between the wheels 362, 364, primarily loosened dirt 314 is placed over the planting path, as shown in FIG. 15, by the means 356. By moving the wheels 412, 414 laterally away from each other, as to a position shown in phantom lines in FIG. 12, the wheels 412, 414 pick up not only loosened dirt but a significant amount of residue 358 from adjacent rows and cause the same to be deposited in the planting path so that significant amounts of residue 358 define a thickened ground cover. This may be desirable, for example, on slopes where there is greater tendency for erosion to occur.

A means 440 may be provided to act between the frame 346 and support bar 416 and exert an adjustable bias on the support bar 416.

With the inventive apparatus 340, a unique technique can be practiced. In the fall, after harvest takes place, the apparatus 340 can be used to apply an additive and provide a confining blanket over the additive-laden soil to confine the additive so that it will be effectively absorbed by the soil. Additive applied in the fall will be absorbed by and retained within the soil when planting takes place in the spring. In addition to the fact that the pre-application of the additive prepares the soil for planting, the pre-application technique avoids the problem of having to apply additive and seed at the same time in the spring. As indicated previously, when simultaneous planting and additive application occur, the amount of additive normally must be significantly reduced to avoid damage to the seed. At the same time, the additive and seed are not applied in equal amounts so that the farmer must interrupt operations and normally replace the seed supply on the planters more frequently than the supply of additive must be replenished.

With the inventive structure, the soil 314 is effectively prepared for the reception of additive by the first means 350. Residue is cleared more effectively than with the coulter wheel 306 alone, as with the prior art apparatus 300 in FIG. 17. The invention does contemplate that a coulter wheel 442 could be used, as in the prior art, upstream of the first means 350, as shown in FIG. 10. This may enhance the soil breakup before the additive application.

The inventive structure works effectively in wet conditions. The apparatus 340 can be drawn over the field in the spring prior to planting. Preferably the additive is applied well in advance of planting. However, even pre-treatment two hours ahead of planting has beneficial effects by reason of allowing otherwise wet soil to be broken up and dried out prior to planting. The inventive apparatus 340 breaks up the soil and in addition thereto, captures only beneficial amounts of air in the soil.

The foregoing disclosure of specific embodiments is intended to be illustrative of the broad concepts comprehended by the invention.

We claim:

1. A method of continuously applying an additive to soil with a soil treating apparatus as the soil treating apparatus is advanced in a travel direction along a planting path on soil being treated, said method comprising the steps of:

resituating at least one of residue and soil in the planting path in a lateral direction transverse to the travel direction away from the planting path;

applying an additive to the soil; and moving at least one of residue and soil laterally inwardly over the planting path after the additive is applied to the soil, wherein the step of resituating at least one of residue and soil comprises the step of rotating a toothed wheel about an axis transverse to the travel direction so that the toothed wheel picks up and moves at least one of residue and soil in the planting path away from the planting path, wherein the step of resituating at least one of residue and soil further includes the step of biasably urging the toothed wheel downwardly against the soil.

2. A method of continuously applying an additive to soil with a soil treating apparatus as the soil treating apparatus is advanced in a travel direction along a planting path on soil being treated, said method comprising the steps of:

resituating at least one of soil and residue in the planting path in a lateral direction transverse to the travel direction away from the planting path;

applying an additive to the soil; and moving at least one of residue and soil laterally inwardly over the planting path after the additive is applied to the soil, wherein the step of resituating at least one of soil and residue comprises the step of rotating first and second toothed wheels about first and second axes that are transverse to each other and the travel direction, wherein the step of moving at least one of residue and soil inwardly comprises the step of rotating second and third wheels about second and third axes extending transverse to each other and the travel direction in the soil at locations spaced laterally from each other a distance greater than a distance the first and second wheels are spaced from each other.

3. A method of continuously applying an additive to soil with a soil treating apparatus as the soil treating apparatus is advanced in a travel direction along a planting path on soil being treated, said method comprising the steps of:

resituating at least one of soil and residue in the planting path in a lateral direction transverse to the travel direction away from the planting path;

applying an additive to the soil; and moving at least one of residue and soil laterally inwardly over the planting path after the additive is applied to the soil, wherein the step of moving at least one of residue and soil laterally inwardly comprises the step of rotating a toothed wheel about an axis extending transverse to the travel direction, said method further including the step of varying the lateral position of the toothed wheel to change the movement of soil over the planting path by the toothed wheel.

4. A method of continuously applying an additive to soil with a soil treating apparatus as the soil treating apparatus is advanced in a travel direction along a planting path on soil being treated, said method comprising the steps of:

applying an additive to the soil; and moving at least one of residue and soil laterally inwardly over the planting path after the additive is applied to the soil, wherein the step of moving at least one of residue and soil laterally inwardly comprises the step of rotating a first toothed wheel about an axis extending transverse to the travel direction, said method further including the step of providing a second toothed wheel and the step of moving at least one of residue and soil laterally inwardly comprises the step of rotating the second toothed wheel about an axis that resides in a plane that is transverse to but not perpendicular to the travel direction, wherein the step of moving at least one of residue and soil laterally inwardly comprises the step of meshing teeth on the first and second toothed wheels as the first and second toothed wheels are rotated.

5. An apparatus for applying an additive to soil, said apparatus comprising:

a frame to be advanced in a travel direction over a planting path;

first means on the frame for resituating at least one of soil and residue in a lateral direction transversely to the travel direction away from a planting path;

second means on the frame for applying an additive to soil in a planting path; and third means for moving at least one of residue and soil laterally over a planting path after additive is applied to the soil by the second means as the apparatus is advanced in the travel direction, wherein the first means comprises at least one wheel mounted to the frame for rotation about an axis that is transverse to the travel direction, said apparatus further including means for continuously biasing the one wheel into soil.

6. An apparatus for applying an additive to soil, said apparatus comprising:

a frame to be advanced in a travel direction over a planting path;

first means on the frame for resituating at least one of soil and residue in a lateral direction transversely to the travel direction away from a planting path;

second means on the frame for applying an additive to soil in a planting path; and third means for moving at least one of residue and soil laterally over a planting path after additive is applied to the soil by the second means as the apparatus is advanced in the travel direction, wherein the first means comprises first and second toothed wheels that are rotatable about first and second axes that are transverse to each other and the travel direction, with the first and second axes each residing in a plane that is non-perpendicular to the travel direction, wherein the third means comprises third and fourth wheels that are rotatable about third and fourth axes that are each transverse to the travel direction and means are provided for mounting the third and fourth wheels to the frame so that the spacing of the third and fourth wheels transverse to the travel direction can be varied.

7. The apparatus for applying an additive according to claim 6 wherein the mounting means mounts the third and fourth wheels so that the spacing of the third and fourth wheels transverse to the travel direction can be greater than the spacing of the first and second wheels transverse to the travel direction.

8. An apparatus for applying an additive to soil, said apparatus comprising;

a frame to be advanced in a travel direction over a planting path;

means on the frame for applying an additive to soil in a planting path; and means for moving at least one of residue and soil laterally over a planting path after additive is applied to the soil by the soil applying means as the apparatus is advanced in the travel direction, wherein the means for moving at least one of residue and soil comprises at least a first rotatable wheel, and means are provided for varying the lateral position of the first rotatable wheel relative to the frame.

9. An apparatus for applying an additive to soil, said apparatus comprising:

a frame to be advanced in a travel direction over a planting path;

means on the frame for applying an additive to soil in a planting path; and means for moving soil laterally over a planting path after additive is applied to the soil by the soil applying means as the apparatus is advanced in the travel direction, wherein the means for moving at least one of residue and soil comprises first and second toothed, rotatable wheels mounted to the frame for rotation about first and second transverse axes, said first and second axes being transverse to the travel direction and each residing in a plane that is not perpendicular to the travel direction, wherein teeth on the first and second toothed wheels are in mesh with each other.

10. Apparatus for applying an additive to soil, comprising a frame adapted to be towed by a tractor;

residue-relocating means mounted on the frame for clearing residue laterally away from a planting path;

a soil-parting device mounted on the frame behind the residue-relocating means for parting subjacent soil to form a slot in the soil along the cleared path;

an additive delivery means mounted on the frame for depositing an additive in the slot; and a pair of toothed wheel means rotatably mounted on the frame behind the additive delivery means for covering the deposited additive with loose soil, said toothed wheels being toed inwardly at the bottoms thereof and converging toward each other toward their trailing edges.

11. Apparatus for applying an additive to soil, comprising a frame adapted to be towed by a tractor;

residue-relocating means mounted on the frame for clearing residue laterally away from a planting path;

a soil-parting device mounted on the frame behind the residue-relocating means for parting subjacent soil to form a slot in the soil along the cleared path;

an additive delivery means mounted on the frame for depositing an additive in the slot; and a pair of toothed wheel means rotatably mounted on the frame behind the additive delivery means for covering the deposited additive with soil and residue, the soil engaging portions of said toothed wheels being located laterally beyond the cleared planting path.

12. The apparatus of claim 10 or 11 in which said residue-relocating means is a pair of toothed wheels rotatably mounted on said frame.

* * * * *